United States Patent
Ono

(10) Patent No.: US 7,683,932 B2
(45) Date of Patent: Mar. 23, 2010

(54) STORAGE APPARATUS AND CONTROL METHOD

(75) Inventor: Tachio Ono, Kanagawa (JP)

(73) Assignee: Canon Kabishiki Kaisha, Tokyo (JP)

( * ) Notice: Subject to any disclaimer, the term of this patent is extended or adjusted under 35 U.S.C. 154(b) by 634 days.

(21) Appl. No.: 10/500,803

(22) PCT Filed: Jan. 22, 2003

(86) PCT No.: PCT/JP03/00518

§ 371 (c)(1),
(2), (4) Date: Jul. 7, 2004

(87) PCT Pub. No.: WO03/065196

PCT Pub. Date: Aug. 7, 2003

(65) Prior Publication Data

US 2005/0122398 A1    Jun. 9, 2005

(30) Foreign Application Priority Data

Jan. 31, 2002    (JP)  ............................. 2002-024609

(51) Int. Cl.
H04N 5/225    (2006.01)
H04N 9/04    (2006.01)
(52) U.S. Cl. .................. 348/207.1; 348/207.11; 348/207.99
(58) Field of Classification Search ............ 348/207.99, 348/207.1, 207.11, 231.7, 231.99, 552
See application file for complete search history.

(56) References Cited

U.S. PATENT DOCUMENTS

| | | | |
|---|---|---|---|
| 4,236,209 A * | 11/1980 | Lombardo et al. ............ | 709/249 |
| 4,710,917 A | 12/1987 | Tompkins et al. | |
| 4,974,200 A | 11/1990 | Ono et al. ........................ | 365/29 |
| 4,974,201 A | 11/1990 | Ono et al. ........................ | 365/29 |
| 5,105,383 A | 4/1992 | Saito et al. ...................... | 365/87 |

(Continued)

FOREIGN PATENT DOCUMENTS

DE    199 41 742    3/2001

(Continued)

OTHER PUBLICATIONS

Japanese Office Action dated Jan. 22, 2008 in corresponding Japanese application No. 2002-024609.

(Continued)

*Primary Examiner*—David L Ometz
*Assistant Examiner*—Richard M Bemben
(74) *Attorney, Agent, or Firm*—Fitzpatrick, Cella, Harper & Scinto

(57) ABSTRACT

A storage apparatus includes first, second and third interface units. The first interface unit has a first port for connection to a first external apparatus. The second interface unit has a second port for connection to a second external apparatus. The third interface unit is for connection to a removable storage medium. The storage apparatus sets the second port in a disabled state responsive to a determination that the first external apparatus connected to the first port is capable of accessing the removable storage medium connected to the third interface unit. The storage apparatus sets the first port in the disabled state responsive to a determination that the second external apparatus connected to the second port is capable of accessing the removable storage medium connected to the third interface unit.

5 Claims, 3 Drawing Sheets

U.S. PATENT DOCUMENTS

| | | | |
|---|---|---|---|
| 5,298,895 A | 3/1994 | Van Maren | |
| 5,526,367 A | 6/1996 | Ono et al. | 371/32 |
| 5,546,382 A | 8/1996 | Fujino | |
| 5,561,750 A | 10/1996 | Lentz | |
| 5,717,496 A | 2/1998 | Satoh et al. | |
| 5,734,373 A | 3/1998 | Rosenberg et al. | |
| 5,739,921 A | 4/1998 | Kitajima | |
| 5,764,278 A | 6/1998 | Nagao | |
| 5,806,007 A | 9/1998 | Raith et al. | |
| 5,841,471 A | 11/1998 | Endsley et al. | |
| 5,969,750 A | 10/1999 | Hsieh et al. | |
| 5,999,561 A | 12/1999 | Naden et al. | |
| 6,033,072 A | 3/2000 | Ono et al. | 351/208 |
| 6,049,823 A | 4/2000 | Hwang | |
| 6,054,990 A | 4/2000 | Tran | |
| 6,064,398 A | 5/2000 | Ellenby et al. | |
| 6,064,491 A | 5/2000 | Matsumoto | |
| 6,088,045 A | 7/2000 | Lumelsky et al. | |
| 6,091,728 A | 7/2000 | Lazraq et al. | |
| 6,115,137 A | 9/2000 | Ozawa et al. | |
| 6,130,758 A | 10/2000 | Funazaki | |
| 6,138,178 A | 10/2000 | Watanabe et al. | |
| 6,167,061 A | 12/2000 | Nakatsugawa | |
| 6,195,068 B1 | 2/2001 | Suzuki et al. | |
| 6,208,266 B1 | 3/2001 | Lyons et al. | |
| 6,249,241 B1 | 6/2001 | Jordan et al. | |
| 6,251,014 B1 | 6/2001 | Stockdale et al. | |
| 6,252,583 B1 | 6/2001 | Braun et al. | |
| 6,356,813 B1 * | 3/2002 | Sommer et al. | 701/1 |
| 6,477,589 B1 | 11/2002 | Suzuki et al. | |
| 6,715,071 B2 | 3/2004 | Ono et al. | |
| 6,745,256 B2 | 6/2004 | Suzuki et al. | |
| 6,996,096 B2 | 2/2006 | Niida et al. | |
| 7,369,875 B2 * | 5/2008 | Kuba | 455/557 |
| 2001/0006400 A1 * | 7/2001 | Kubo et al. | 348/233 |
| 2001/0012064 A1 * | 8/2001 | Kubo | 348/231 |
| 2002/0108118 A1 * | 8/2002 | Cohen et al. | 725/105 |
| 2002/0149677 A1 * | 10/2002 | Wright | 348/207.1 |
| 2003/0005188 A1 | 1/2003 | Tehrani et al. | 710/15 |

FOREIGN PATENT DOCUMENTS

| | | |
|---|---|---|
| EP | 0 751 464 | 1/1997 |
| JP | 02-294757 | 12/1990 |
| JP | 6-195280 | 7/1994 |
| JP | 9-11585 | 1/1997 |
| JP | 09-011585 | 1/1997 |
| JP | 10-290246 | 10/1998 |
| WO | 01/19076 | 3/2001 |

OTHER PUBLICATIONS

Japanese Office Action dated Sep. 16, 2008 in corresponding Japanese Application No. 2002-024609.

Issei Kino, Queueing networks with hierarchical configuration of active and passive stations, IEEE, 1996, pp. 3051-3056.

\* cited by examiner

STORAGE APPARATUS AND CONTROL METHOD

TECHNICAL FIELD

The present invention relates to an apparatus, which has a plurality of digital interfaces, and a control method applied to the apparatus.

BACKGROUND ART

Currently, a digital video camera is available which has not only an IEEE1394 interface pursuant to the IEEE1394-1995 standard (see IEEE Std 1394-1995, IEEE Standard for a High Performance Serial Bus, Institute of Electrical and Electronics Engineers, Inc.) but also a USB interface pursuant to the USB 1.1 standard (see Universal Serial Bus Specification Revision 1.1, Sep. 23, 1998).

However, such a digital video camera suffers from a problem in that although an external apparatus connected to the USB interface is capable of accessing a memory card, an external apparatus connected to the IEEE1394 interface is not capable of accessing the memory card.

In the case where the digital video camera is constructed so that not only the external apparatus connected to the USB interface but also the external apparatus connected to the IEEE1394 interface are capable of accessing the memory card, there arises a problem in that it is required to prevent a situation where the two external apparatuses access the memory card at the same time. That is, there arises a problem in that it is required to exclusively control the external apparatuses that access the memory card. This problem is not limited to the memory card and similarly arises even for a removable medium other than the memory card.

DISCLOSURE OF INVENTION

An object of the present invention is to overcome the above-described drawbacks.

Another object of the present invention is to make it possible to exclusively control external apparatuses that access a removable medium such as a memory card.

A storage apparatus that is one of preferred embodiment modes according to the present invention includes a first digital interface and a second digital interface, the first digital interface having a first port and the second digital interface having a second port, in which: the second port is set in a disabled state if a first external apparatus connected to the first port accesses a removable medium; and the first port is set in the disabled state if a second external apparatus connected to the second port accesses the removable medium.

A control method that is one of preferred embodiment modes according to the present invention is a control method applied to a storage apparatus including a first digital interface and a second digital interface, the first digital interface having a first port and the second digital interface having a second port, in which: the second port is placed in a state where electrical connection is impossible if a first external apparatus connected to the first port accesses a removable medium; and the first port is placed in a state where electrical connection is impossible if a second external apparatus connected to the second port accesses the removable medium.

A storage apparatus that is one of preferred embodiment modes according to the present invention includes a first digital interface and a second digital interface, the first digital interface having a first port and the second digital interface having a second port, in which: if the first digital interface receives a predetermined command, the second port is set in a disabled state; and if the second digital interface receives the predetermined command, the first port is set in the disabled state.

A control method that is one of preferred embodiment modes according to the present invention is a control method including a first digital interface and a second digital interface, the first digital interface having a first port and the second digital interface having a second port, in which: if the first digital interface receives a predetermined command, the second port is set in a disabled state; and if the second digital interface receives the predetermined command, the first port is set in the disabled state.

Still other objects, features and advantages of the present invention will become fully apparent from the following detailed description of the preferred embodiments.

BEST MODE FOR CARRYING OUT THE INVENTION

A preferred embodiment of the present invention will be described below with reference to the drawings.

Figure 1:
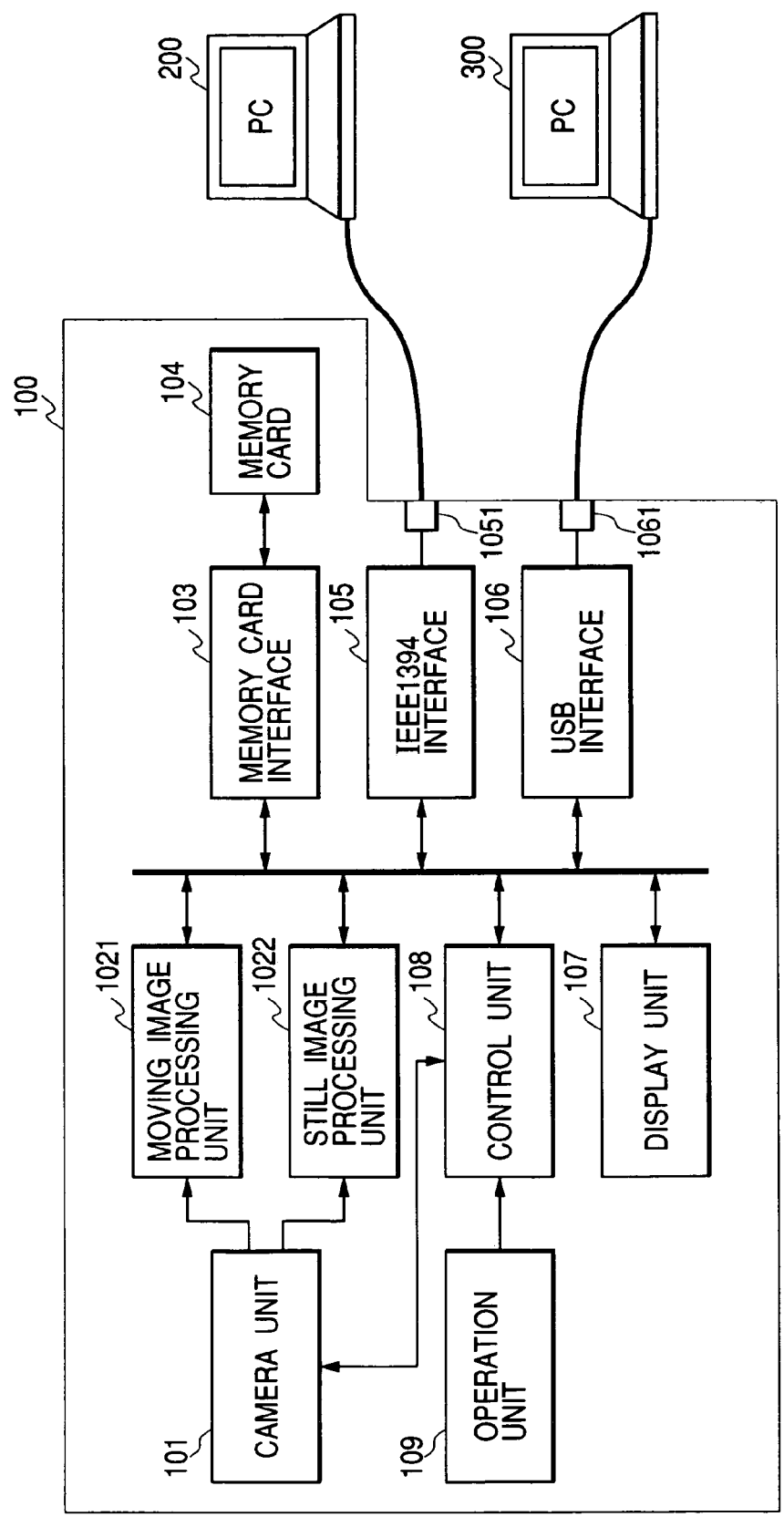
FIG. 1 is a block diagram showing the main construction of a storage apparatus (digital video camera 100) in an embodiment of the present invention.

FIG. 1 shows the construction of a storage apparatus in this embodiment.

In FIG. 1, a digital video camera (hereinafter referred to as the "DVC") 100 is a storage apparatus of this embodiment and includes a plurality of digital interfaces. As shown in FIG. 1, the DVC 100 includes a camera unit 101, a moving image processing unit 1021, a still image processing unit 1022, a memory card interface 103, a memory card 104, an IEEE1394 interface 105, a USB interface 106, a display unit 107, a control unit 108, and an operation unit 109.

The camera unit 101 takes, when a still image photographing mode is set, an optical image of a subject and generates still image data. Also, when a moving image photographing mode is set, the camera unit 101 takes optical images of a subject and generates moving image data.

The moving image processing unit 1021 converts the moving image data generated by the camera unit 101 into a moving image file in a predetermined file format (MPEG-4 format, for instance). The moving image file generated by the moving image processing unit 1021 is supplied to the memory card interface 103 and is written into the memory card 104.

The still image processing unit 1022 converts the still image data generated by the camera unit 101 into a still image file in a predetermined file format (JPEG format, JPEG-2000 format, for instance). The still image file generated by the still image processing unit 1022 is supplied to the memory card interface 103 and is written into the memory card 104.

The memory card interface 103 has a function of writing the moving image file or still image file into the memory card 104 and a function of reading the moving image file or still image file stored in the memory card 104. The moving image file or still image file read from the memory card 104 is supplied to the IEEE1394 interface 105 or the USB interface 106.

The IEEE1394 interface 105 is a digital interface pursuant to the IEEE1394-1995 standard, which is one of standards related to a serial bus, or its extended standard (IEEE1394a-2000 standard (see IEEE Std 1394a-2000, IEEE Standard for a High Performance Serial Bus-Amendment 1) or the like). The IEEE1394 interface 105 has one 1394 port 1051, as shown in FIG. 1. In this embodiment, it is assumed that the maximum data transfer rate of the IEEE1394 interface 105 is 100 Mbps.

The USB interface 106 is a digital interface pursuant to the USB 1.1 standard, which is one of standards related to a serial bus, or its extended standard (USB 2.0 standard (see Universal Serial Bus Specification Revision 2.0, Apr. 27, 2000) or the like). The USB interface 106 has one USB port 1061, as shown in FIG. 1. In this embodiment, it is assumed that the maximum data transfer rate of the USB interface 106 is 12 Mbps.

The display unit 107 displays the still image file or moving image file read from the memory card 104. The display unit 107 also displays information showing an operation mode set in the DVC 100, an operation state of the DVC 100, a state of the 1394 port 1051, a state of the USB port 1061, and the like.

The control unit 108 includes a memory in which there is stored a control program for controlling various functions of the DVC 100, a microcomputer that executes the control program stored in the memory, and the like. Note that it is assumed that the memory of the control unit 108 also stores a control program for executing a flowchart shown in FIG. 2.

The operation unit 109 includes switches with which the various functions of the DVC 100 are operated. For instance, the operation unit 109 includes a mode switching switch with which there is performed switching between operation modes of the DVC 100, a still image photographing switch with which there is designated the photographing of a still image to be stored in the memory card 104, a moving image photographing switch with which there is designated the photographing of a moving image to be stored in the memory card 104, a menu switch with which there is invoked a menu screen through which various settings of the DVC 100 are changed, and the like. With the mode switching switch, it is possible to select a memory reproduction mode that is one of the operation modes of the DVC 100. This memory reproduction mode is an operation mode in which the still image file or moving image file stored in the memory card 104 is reproduced or is sent to an external apparatus.

A personal computer (hereinafter referred to as the "PC") 200 is a first external apparatus in this embodiment and it is possible to connect this PC 200 to the 1394 port 1051. In the case where the PC 200 is connected to the 1394 port 1051, the PC 200 sends a predetermined command to the DVC 100, thereby informing the DVC 100 that the PC 200 is an external apparatus that is capable of accessing the memory card 104.

A personal computer (hereinafter referred to as the "PC") 300 is a second external apparatus in this embodiment and it is possible to connect this PC 300 to the USB port 1061. In the case where the PC 300 is connected to the USB port 1061, the PC 300 sends a predetermined command to the DVC 100, thereby informing the DVC 100 that the PC 300 is an external apparatus that is capable of accessing the memory card 104.

Figure 2:
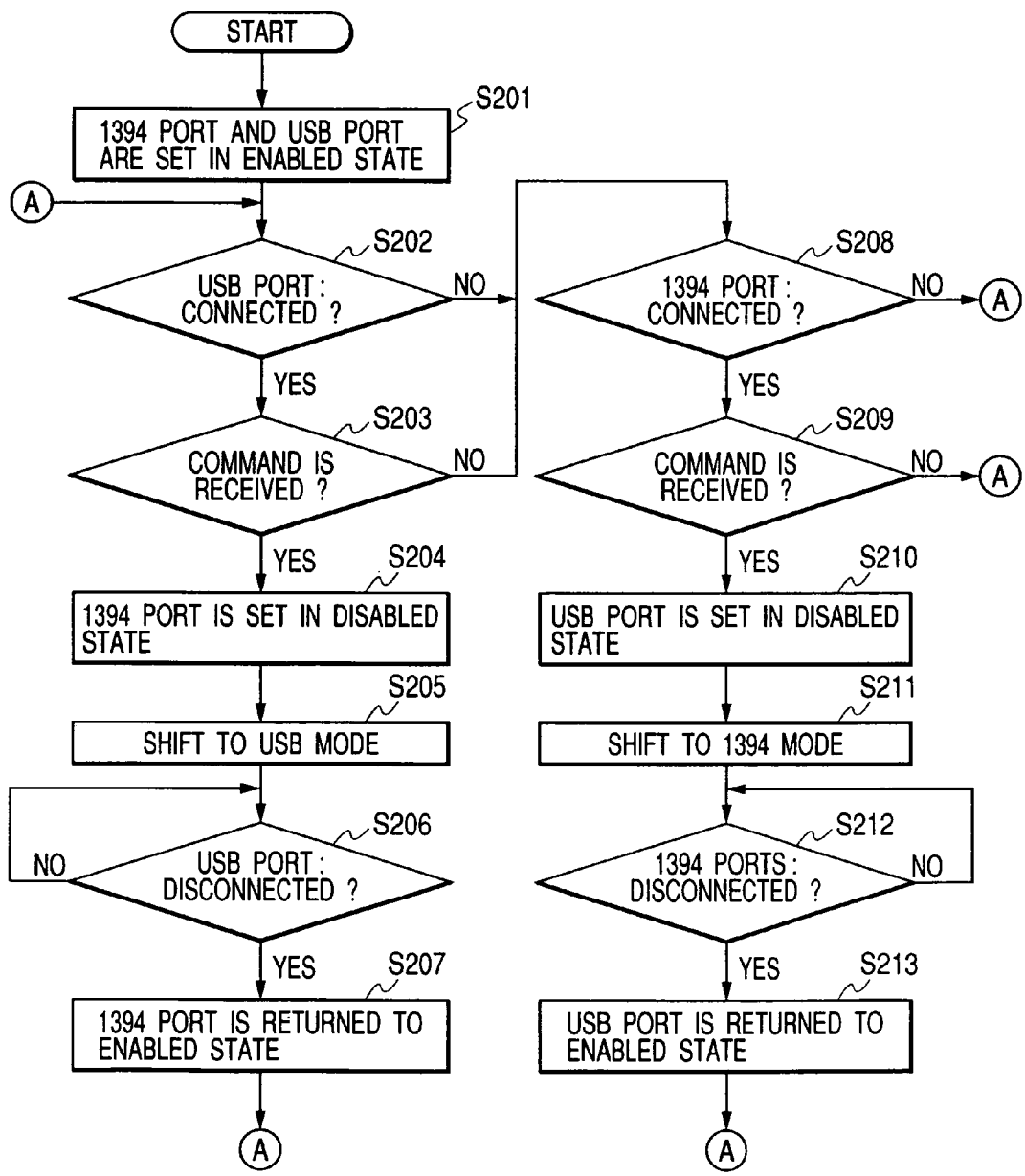
FIG. 2 is a flowchart showing a processing procedure of the storage apparatus (digital video camera 100) in the embodiment.

FIG. 2 is a flowchart showing a processing procedure of the DVC 100. The flowchart shown in FIG. 2 is executed in the case where the operation mode set in the DVC 100 becomes the memory reproduction mode.

In step S201, in the case where the operation mode set in the DVC 100 becomes the memory reproduction mode, the control unit 108 shifts to a main mode. After shifting to the main mode, the control unit 108 sets the 1394 port 1051 and the USB port 1061 in an enabled state. In the case where the 1394 port 1051 is set in the enabled state, the PC 200 is placed in a state where connection with the 1394 port 1051 is possible physically and electrically. Also, in the case where the USB port 1061 is set in the enabled state, the PC 300 is placed in a state where connection with the USB port 1061 is possible physically and electrically.

In step S202, the control unit 108 judges whether the PC 300 is connected to the USB port 1061. It is possible to detect whether the PC 300 is connected to the USB port 1061 using a plug-and-play function of the USB interface 106. In the case where the PC 300 is connected to the USB port 1061, the control unit 108 starts processing in step S203. On the other hand, in the case where no apparatus is connected to the USB port 1061, the control unit 108 starts processing in step S208.

In step S203, the control unit 108 judges whether a predetermined command is received by the USB interface 106. In the case where the predetermined command is received by the USB interface 106, the control unit 108 judges that the PC 300 is an apparatus that is capable of accessing the memory card 104. In this case, the control unit 108 starts processing in step S204. On the other hand, in the case where the predetermined command cannot be received, the control unit 108 starts processing in step S208.

In step S204, the control unit 108 sets the 1394 port 1051 in a disabled state, thereby making it impossible for the PC 200 to establish electrical connection with the 1394 port 1051. When the 1394 port 1051 is set in the disabled state, the PC 200 becomes incapable of accessing the memory card 104 via the IEEE1394 interface 105. Note that in the case where the 1394 port 1051 is set in the disabled state, the IEEE1394 interface 105 prohibits supplying a bias to a TPA line and a TPA* line of the 1394 port 1051.

Figure 3:
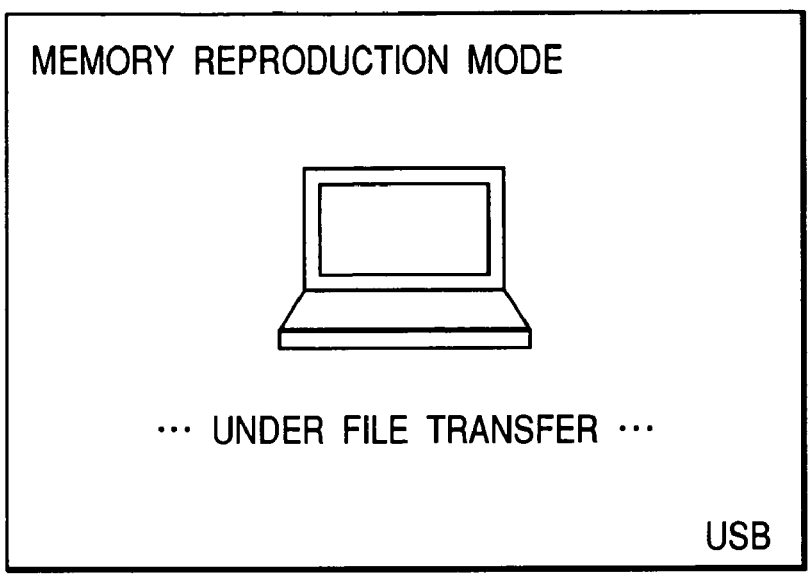
FIG. 3 shows an example of a screen indicating that a second external apparatus (PC 300) in the embodiment accesses a memory card 104 via a USB interface 106.

In step S205, the control unit 108 shifts from the main mode to the USB mode and allows the PC 300 to access the memory card 104 via the USB interface 106. As a result of this operation, the PC 300 becomes capable of accessing the memory card 104 and reading a desired still image file or moving image file from the memory card 104. Note that after shifting to the USB mode, the control unit 108 displays a screen shown in FIG. 3 on the display unit 107 in order to explicitly show a user a current operation mode of the DVC 100, a current operation state of the DVC 100, and a fact that the USB interface 106 is set in the enabled state.

In step S206, after shifting to the USB mode, the control unit 108 judges whether the PC 300 is disconnected from the USB port 1061 physically or electrically. It is possible to detect whether the PC 300 is disconnected from the USB port 1061 physically or electrically using the plug-and-play function of the USB interface 106. In the case where the user pulls a cable connecting the DVC 100 to the PC 300 out of the USB port 1061, the USB interface 106 automatically detects a situation where the PC 300 is disconnected from the USB port 1061 physically and electrically. Also, when the PC 300 is powered off, the USB interface 106 automatically detects a situation where the PC 300 is disconnected from the USB port 1061 electrically. In the case where the PC 300 is disconnected from the USB port 1061 physically or electrically, the control unit 108 starts processing in step S207.

In step S207, the control unit 108 shifts from the USB mode to the main mode. After shifting to the main mode, the control unit 108 returns the 1394 port 1051 to the enabled state and starts processing in step S202.

In step S208, the control unit 108 judges whether the PC 200 is connected to the 1394 port 1051. It is possible to detect whether the PC 200 is connected to the 1394 port 1051 using a plug-and-play function of the IEEE1394 interface 105. In the case where the PC 200 is connected to the 1394 port 1051, the control unit 108 starts processing in step S209. On the other hand, in the case where no apparatus is connected to the 1394 port 1051, the control unit 108 starts processing in step S202.

In step S209, the control unit 108 judges whether a predetermined command is received by the IEEE1394 interface 105. In the case where the predetermined command is received by the IEEE1394 interface 105, the control unit 108 judges that the PC 200 is an apparatus that is capable of accessing the memory card 104. In this case, the control unit 108 starts processing in step S210. On the other hand, in the case where the predetermined command cannot be received, the control unit 108 starts processing in step S202.

In step S210, the control unit 108 sets the USB port 1061 in a disabled state, thereby making it impossible for the PC 300 to establish electrical connection with the USB port 1061. When the USB port 1061 is set in the disabled state, the PC 300 becomes incapable of accessing the memory card 104 via the USB interface 106. Note that in the case where the USB port 1061 is set in the disabled state, the USB interface 106 prohibits pull-up of a D+ line and a D− line of the USB port 1061.

Figure 4:
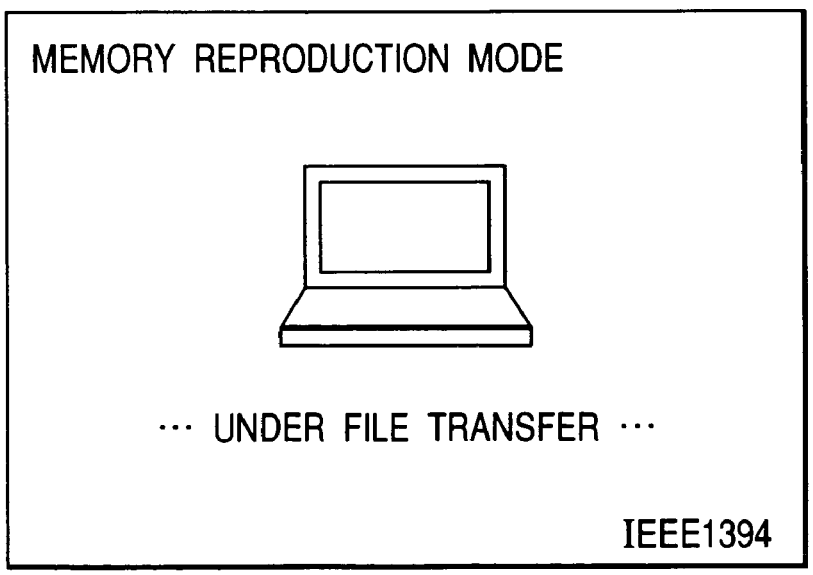
FIG. 4 shows an example of a screen indicating that a first external apparatus (PC 200) in the embodiment accesses the memory card 104 via an IEEE1394 interface 105.

In step S211, the control unit 108 shifts from the main mode to the 1394 mode and allows the PC 200 to access the memory card 104 via the IEEE1394 interface 105. As a result of this operation, the PC 200 becomes capable of accessing the memory card 104 and reading a desired still image file or moving image file from the memory card 104. Note that after shifting to the 1394 mode, the control unit 108 displays a screen shown in FIG. 4 on the display unit 107 in order to explicitly show a user a current operation mode of the DVC 100, a current operation state of the DVC 100, and a fact that the IEEE1394 interface 105 is set in the enabled state.

In step S212, after shifting to the 1394 mode, the control unit 108 judges whether the PC 200 is disconnected from the 1394 port 1051. It is possible to detect whether the PC 200 is disconnected from the 1394 port 1051 physically or electrically using the plug-and-play function of the IEEE1394 interface 105. In the case where the user pulls a cable connecting the DVC 100 to the PC 200 out of the 1394 port 1051, the IEEE1394 interface 105 automatically detects a situation where the PC 200 is disconnected from the 1394 port 1051 physically and electrically. Also, when the PC 200 is powered off, the IEEE1394 interface 105 automatically detects a situation where the PC 200 is disconnected from the 1394 port 1051 electrically. In the case where the PC 200 is disconnected from the 1394 port 1051 physically or electrically, the control unit 108 starts processing in step S213.

In step S213, the control unit 108 shifts from the 1394 mode to the main mode. After shifting to the main mode, the control unit 108 returns the USB port 1061 to the enabled state and starts processing in step S202.

As described above, with the DVC 100 of this embodiment, by carrying out the processing procedure shown in FIG. 2, in the case where the PC 200 connected to the 1394 port 1051 accesses the memory card 104, the USB port 1061 is set in the disabled state and there is obtained a state where it is impossible to establish electrical connection between the USB port 1061 and the PC 300. As a result, in the case where the PC 200 accesses the memory card 104 via the IEEE1394 interface 105, the PC 300 is prohibited from accessing the memory card 104 via the USB interface 106. That is, it becomes possible to exclusively control external apparatuses that access the memory card 104.

Also, with the DVC 100 of this embodiment, by carrying out the processing procedure shown in FIG. 2, in the case where the PC 300 connected to the USB port 1061 accesses the memory card 104, the 1394 port 1051 is set in the disabled state and there is obtained a state where it is impossible to establish electrical connection between the 1394 port 1051 and the PC 200. As a result, in the case where the PC 300 accesses the memory card 104 via the USB interface 106, the PC 200 is prohibited from accessing the memory card 104 via the IEEE1394 interface 105. That is, it becomes possible to exclusively control external apparatuses that access the memory card 104.

It should be noted here that it is also possible to apply the present invention to a digital video camera, a storage apparatus, or the like that exclusively controls external apparatuses that access a removable medium (such as a magnetic disk, an optical disk, or a hard disk apparatus) other than the memory card 104.

The above-described preferred embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

The invention claimed is:

1. A storage apparatus comprising:
   a first interface unit for connection to a first external apparatus, said first interface unit having a first port to which the first external apparatus is connectable and disconnectable and through which said first interface unit connects to the first external apparatus;
   a second interface unit for connection to a second external apparatus, said second interface unit having a second port to which the second external apparatus is connectable and disconnectable and through which said second interface unit connects to the second external apparatus;
   a third interface unit for connection to a removable storage medium; and
   a control unit that sets the first port in an enabled state or a disabled state, and sets the second port in the enabled state or the disabled state,
   wherein if said first interface unit detects that the first external apparatus is connected to the first port, said control unit determines whether the first external apparatus is capable of accessing the removable storage medium connected to said third interface unit,
   wherein if said second interface unit detects that the second external apparatus is connected to the second port, said control unit determines whether the second external apparatus is capable of accessing the removable storage medium connected to said third interface unit,
   wherein said control unit does not set the second port in the disabled state until said control unit determines that the first external apparatus connected to the first port is capable of accessing the removable storage medium connected to said third interface unit,
   wherein said control unit does not set the first port in the disabled state until said control unit determines that the second external apparatus connected to the second port is capable of accessing the removable storage medium connected to said third interface unit, wherein if said control unit determines that the second external apparatus is disconnected from the second port when the first port is in the disabled state, said control unit returns the first port from the disabled state to the enabled state, wherein if said control unit determines that the first external apparatus is disconnected from the first port when the second port is in the disabled state, said control unit returns the second port from the disabled state to the enabled state, and wherein the storage apparatus is a digital video camera.

2. The storage apparatus according to claim 1, wherein if the first port is set in the disabled state, the first port can not electrically connect to the first external apparatus, and wherein if the second port is set in the disabled state, the second port can not electrically connect to the second external apparatus.

3. The storage apparatus according to claim 1, wherein said first interface unit conforms to an IEEE 1394-1995 standard or an IEEE 1394a-2000 standard.

4. The storage apparatus according to claim 1, wherein said second interface unit conforms to a USB 1.1 standard or a USB 2.0 standard.

5. The storage apparatus according to claim 1, wherein if said first interface unit receives a predetermined command from the first external apparatus, said control unit determines that the first external apparatus is capable of accessing the removable storage medium connected to said third interface unit, and wherein if said second interface unit receives a predetermined command from the second external apparatus, said control unit determines that the second external apparatus is capable of accessing the removable storage medium connected to said third interface unit.

* * * * *